United States Patent [19]

Schwab et al.

[11] 4,194,888

[45] Mar. 25, 1980

[54] ELECTROSTATIC PRECIPITATOR

[75] Inventors: James J. Schwab, Seattle, Wash.; Jacob Cooper, North Hollywood, Calif.

[73] Assignee: Air Pollution Systems, Inc., Kent, Wash.

[21] Appl. No.: 763,524

[22] Filed: Jan. 28, 1977

Related U.S. Application Data

[63] Continuation-in-part of Ser. No. 726,244, Sep. 9, 1976, abandoned.

[51] Int. Cl.² .............................................. B03C 3/74
[52] U.S. Cl. .............................................. 55/2; 55/6; 55/122; 55/136; 55/146; 55/152; 55/154
[58] Field of Search ...................... 55/2, 10, 6, 13, 119, 55/122, 136–138, 146, 150–153, 154

[56] References Cited

U.S. PATENT DOCUMENTS

| | | | |
|---|---|---|---|
| 1,322,163 | 11/1919 | Conover | 55/152 |
| 1,442,052 | 1/1923 | Dane | 55/145 |
| 2,192,249 | 3/1940 | White | 55/13 |
| 3,553,943 | 1/1971 | Sharpe | 55/223 |
| 3,919,391 | 11/1975 | Scholes et al. | 55/10 |
| 3,979,193 | 9/1976 | Sikich | 55/146 |
| 4,056,372 | 11/1977 | Hayashi | 55/152 |
| 4,093,430 | 6/1978 | Schwab et al. | 55/150 |

FOREIGN PATENT DOCUMENTS

| | | | |
|---|---|---|---|
| 456150 | 2/1928 | Fed. Rep. of Germany | 55/119 |
| 1048326 | 8/1953 | France | 55/150 |
| 4412478 | 8/1954 | Japan | 55/13 |

OTHER PUBLICATIONS

Industrial Electrostatic Precipitation-White, pp. 104, 105, dtd. 4/69, Addison-Wesley Publishing Co.

*Primary Examiner*—Bernard Nozick
*Attorney, Agent, or Firm*—Seed, Berry, Vernon & Baynham

[57] ABSTRACT

An electrostatic precipitator having an inner electrode extending along the axis of a tubular outer electrode. The inner electrode includes an elongated support electrode connected to a disc shaped discharge electrode having a transverse dimension larger than the transverse dimension of the support electrode. A high potential applied between the outer electrode and the support and discharge electrodes produces a relatively thin, radially and circumferentially uniform electrostatic field between the discharge electrode and the outer electrode, and a non-corona producing electric field between the support electrode and the outer electrode. A particle entrained gas is directed into the outer electrode at the discharge electrode end. The particles are charged by the thin, intense electrostatic field adjacent the discharge electrode, and are subsequently accelerated toward the outer electrode by the electric field extending between the support electrode and the outer electrode. The particles are then deposited on the walls of the outer electrode where they are removed by a film of liquid flowing along the inner surface of the outer electrode. In an alternate embodiment a plurality of discharge electrodes of either uniform or varying transverse dimensions are spaced apart along the support electrode to provide multiple charging and collection states through which the gas sequentially passes.

8 Claims, 3 Drawing Figures

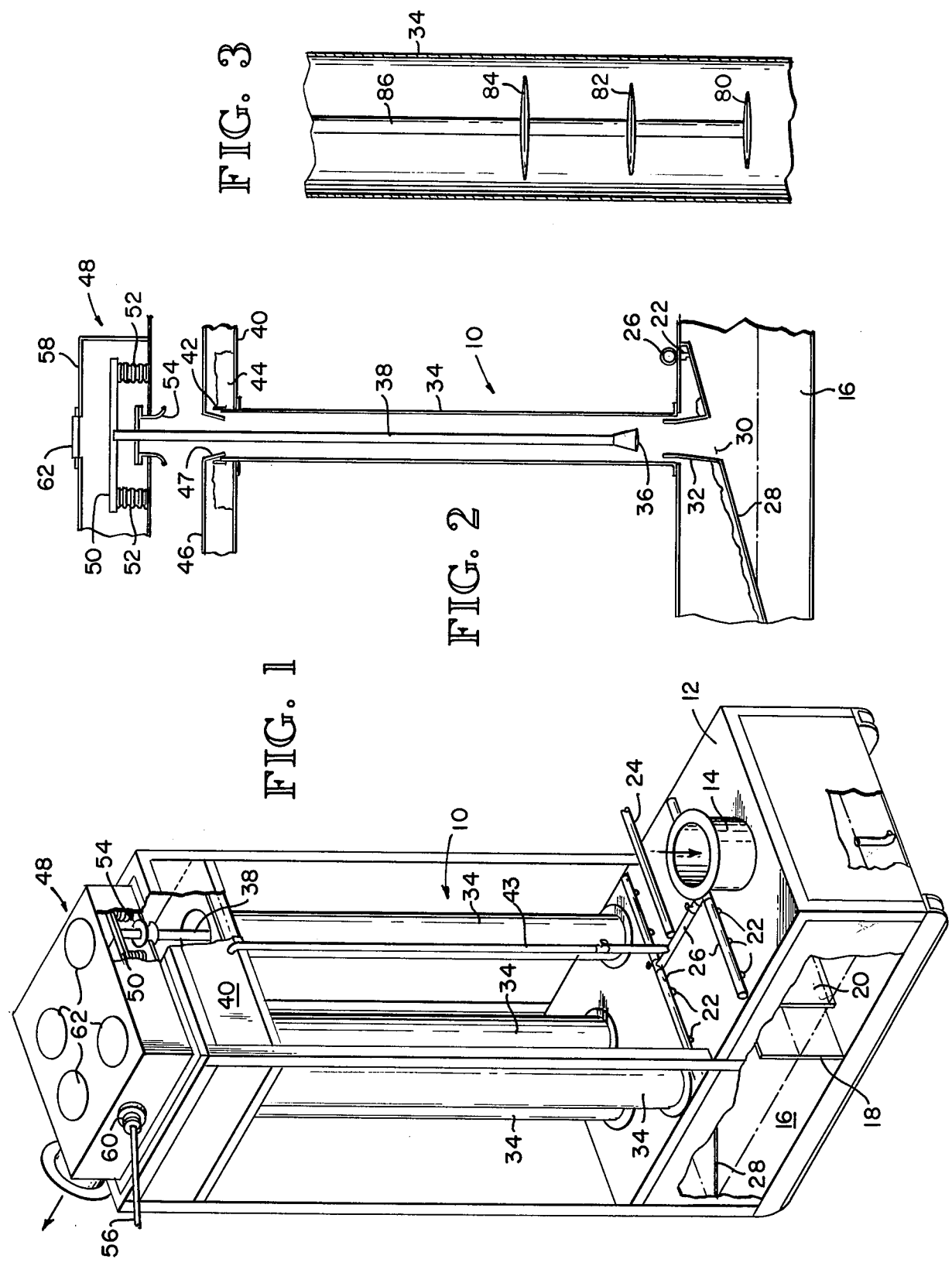

ELECTROSTATIC PRECIPITATOR

This application is a continuation-in-part of Ser. No. 726,244 filed Sept. 9, 1976 now abandoned.

BACKGROUND OF THE INVENTION

1. Field of the Invention

This invention relates to electrostatic precipitators and, more particularly, to an electrostatic precipitator utilizing a particle charging stage followed by a particle collection stage, both of which utilize an inner electrode supported by a single mounting system and powered by a single power supply.

2. Description of the Prior Art

Many industrial processes discharge considerable amounts of atmosphere contaminants as particulates in the sub-micron range. This type of particulate is most difficult to control. Fine particulate emission is becoming the major source of air pollution since the large particulate problems have been easier to bring under control.

Currently, there are three basic approaches to the problem of handling sub-micron size particulates in contaminated gases. The first basic approach is the traditional electrostatic precipitator system. However, the application of electrostatic precipitators to fine particulate control exhibits several inherent problems. One of these problems is contamination of the collector electrodes by the particles removed from the gas which causes the intensity of the electrostatic fields between the electrodes to decrease resulting in reduced particle collection efficiency. Another problem associated with electrostatic precipitators is high power consumption. In order to achieve a relatively high collection efficiency when the particles are less than two to five micron size, longer prior art electrostatic chambers or electrostatic fields of higher intensity must be employed. Longer electrostatic chambers and higher fields increase the current flow between the electrodes resulting in increased power consumption. Further, excessively long electrostatic chambers increase the cost of the equipment as well as the installation expense. Further, higher electrostatic fields also increase the precipitators sensitivity to electrode contamination.

The second basic prior art approach is the wet scrubbing approach which, as applied to the control of fine particulates, generally is of the high-energy venturi type. In order to capture sub-micron particulates in water droplets, however, large quantities of water must be injected and high relative velocities employed. Both of these factors increase the pressure drop of the system resulting in increased energy usage and hence operating cost.

The third basic prior art approach is the dry filter system. A problem with equipment of this type, however, is the temperature limitation of the filter elements, and the related problem of the high cost of reducing the temperature of the particle entrained gases upstream of the filter elements.

Efforts have been made to improve the efficiency of the above described approaches by electrostatically precharging the particulates upstream of the collecting system. These efforts have generally been unsuccessful due primarily to the lack of an effective mechanism for producing a continuous, sufficiently intense field to adequately charge the sub-micron sized particles. Furthermore, such systems generally utilize a charging device which is entirely separate from the collection device and hence require separate equipment, including power supplies, insulators, ducts, etc., for each device.

SUMMARY OF THE INVENTION

It is an object of this invention to provide a high efficiency, low power consuming device for removing fine particles from a gas in which they are suspended.

It is another object of the invention to sequentially direct a particle entrained gas through a plurality of charging stages of varying intensity each of which is followed by a collection stage.

These and other objects of the invention are provided by a charging and collection device having a corona generating, disc shaped discharge electrode mounted on an elongated support electrode having a diameter of from 0.4 to 0.8 the diameter of the discharge electrode. The space axially upstream and downstream of the discharge electode peripheral edge must be clear of current emitting structures for at least 1¼ discharge electrode gaps, defined as the gap between the discharge and outer electrodes, to allow axial wedge shaped expansion of the field at each disc. Since the electrodes are electrically as well as physically connected to each other, a single electrode mounting system and a single power supply are used for both electrodes. The support and discharge electrodes are surrounded by a tublular outer electrode having an inside diameter of from 4 to 7 times the diameter of the support electrode. Since the electrode gap between the support electrode and the outer electrode is greater than the electrode gap between the discharge electrode and the outer electrode, the average intensity in the discharge gap may be sufficient to create a corona discharge while the average field intensity in the support electrode gap is insufficient to create a corona discharge. A particle entrained gas passes between the outer electrode and the discharge electrode and thence past the support electrode. The particles are saturation charged in the discharge electrode gap and are then deflected toward the outer electrode in the support electrode gap where they are collected on the inner surface of the outer electrode by a film of water. If desired, multiple staging may be employed by providing a plurality of discharge electrodes spaced apart along the length of the support electrode by at least 1.2 times the discharge electrode gap. The average field intensity across each discharge electrode gap may be varied by varying the diameter of each discharge electrode. As a further refinement a low field corona discharge may be utilized in the support electrode gap by helically wrapping a wire about the support electrode.

BRIEF DESCRIPTION OF THE FIGURES OF THE DRAWINGS

FIG. 1 is an isometric view of a system for removing particulates entrained in a gas utilizing a plurality of precipitator units.

FIG. 2 is a cross-sectional view taken along the line 2—2 of FIG. 1 illustrating a single precipitator unit.

FIG. 3 is a cross-sectional view taken along the line 2—2 of FIG. 1 illustrating an alternative embodiment of a precipitator unit.

DETAILED DESCRIPTION OF THE INVENTION

The precipitator device illustrated in FIG. 1 utilizes several parallel precipitator units 10. A particle entrained gas enters an inlet manifold 12 through an annular inlet duct 14. The manifold 12 is partially filed with water 16 and a plurality of planar, spaced baffles 18, 20 are positioned in the manifold 12 such that the gas passing through the manifold 12 must flow through the water 16 around the baffles 18, 20. The water 16 is provided to cool the gases entering the inlet duct 14 to promote particle formation by condensation. Additional cooling is provided by a pre-quench spray including a plurality of spray nozzles 22 communicating with a water inlet 24 through pipes 26. The cooling water is recycled by a pump (not shown) with moderate pressure.

After the particulate laden gases have been sufficiently cooled and saturated, they are directed to the portion of the manifold 12 beneath the precipitator units 10. As best illustrated in FIG. 2, a sloped collection surface 28 is placed beneath the precipitator units 10, and an annular aperture 30 having a concentric, cylindrical shield 32 is placed beneath each precipitator unit 10 with the shield 32 extending into the lower end of a tubular outer electrode 34. Each of the precipitator units 10 includes a cylindrical outer electrode 34 enclosing a disc shaped discharge electrode 36 mounted at the lower end of an elongated support electrode 38. "Disc-shaped" is intended to mean any arcuate shape having a peripheral edge forming a closed loop, such as racetrack configurations, ovals, etc. As explained in detail hereinafter, the particles in the gas passing through the aperture 30 are charged within the relatively thin, radially and circumferentially uniform electrostatic field extending between the discharge electrode 36 and the outer electrode 34. The term "electrostatic field" as used herein designates a field producing a corona discharge while the term "electric field" designates a non-corona producing field. The term "relatively thin" designates a field having a radial dimension which is substantially greater than its axial dimension. The charged particles are then accelerated toward the outer electrode 34 by the relatively lower intensity electric field extending between the support electrode 38 and the outer electrode 34. The particles deposited on the inside walls of the outer electrode 34 are collected by a film of water covering the inner walls of the outer electrode 34 and flow downwardly where they are deposited on a collection surface 28. The shield 32 prevents the liquid film from being entrained in the upward gas stream when the liquid falls off the end of the outer electrode 34 onto the collection surface 28. Reentrained liquid from the liquid film covering the inside walls of the outer electrode 34 can cause electrostatic field instability when gas velocities within the outer electrode 34 exceed 10 feet per second.

The upper end of the outer electrode 34 projects into an exhaust plenum 40 where it is surrounded by a cylindrical weir 42. Water is continuously supplied through line 43 by a pump (not shown) so that a thin film of water 44 flows over the weir 42 and down the inside walls of the outer electrode 34. A cover plate 46 extending over the weir water 44 has a cylindrical flange 47 projecting into the outer electrode 34 to allow a smooth air flow from the outer electrode 34 into the exhaust plenum 40 so as not to disturb the weir head water.

The upper ends of the support electrodes 38 extend into a high voltage housing 48 where they are connected to a high voltage bus bar 50 supported on the floor of the housing 48 by insulators 52 and a feed-through shroud 54. The bus bar 50 is connected to an external high voltage power supply or transformer-rectifier set (not shown) through a high voltage conductor 56 (FIG. 1) which passes through the high voltage housing 48 through a feed-through insulator 60. Access to the electrodes 34, 36, 38 is provided by a plurality of annular access covers 62 on the top surface of the housing 48.

The discharge electrode 36 is preferably disc shaped, although other configurations including an oval or race track shaped electrode may also be used. The edge of the electrode 36 should be rounded to a radius which is preferably such that the ratio of the electrode gap (the distance between the electrodes 36, 34) to the discharge electrode edge radius is about 100:1. If the ratio is set below 50:1, sparking will occur at a low applied voltage, yielding a low operating charging current and field. If the ratio exceeds 400:1, the electric field contribution in the gap is reduced, and higher operating current is required to maintain the high fields increasing spark sensitivity to anode contamination. The radius of the collecting electrode 34 should at no point be set less than a ratio of 50:1 to the discharge electrode edge radius when viewed in transverse cross section. Smaller radii may induce sparking at lower applied voltages. The major diameter of the discharge electrode 36 is between 0.2 and 0.5, preferably about 0.35, of the inside diameter of the outer electrode 34. The diameter of the support electrode 38 is between 0.15 and 0.25, preferably about 0.2, of the inside diameter of the outer electrode 34, and between 0.4 and 0.8, preferably 0.5 to 0.6, of the major diameter of the discharge electrode 36. Larger diameter support electrodes 38 can overly suppress the axial expansion of the electrostatic field between the discharge electrode 36 and outer electrode 34 thereby reducing the stability of the field. Smaller diameter support electrodes 38 tend to produce excess corona and sparkover between the support electrode 38 and outer electrode 34. With this electrode geometries, typical high-voltage requirements are such that stable discharge from the discharge electrode 36 can be maintained for applied average field of up to 16–18 kv/cm before sparkover at 70° F. and about 29.92 inches of mercury with gas velocities of under 10 feet per second where air is the gas. The normal operating applied fields between the discharge electrode 36 and the outer electrode 34 are between 10 and 15 kv/cm at these gas conditions depending on particle size, loading and collection efficiency desired. The electric field between the support electrode 38 and the outer electrode 34 is generally between 7–11 kv/cm so that a corona discharge is not produced. The support and discharge electrodes 38, 36, respectively, may be energized either negatively or positively depending on the specific application of the device.

The electrostatic field produced within the electrode gap between the discharge electrode 36 and the collecting electrode 34 is relatively uniform when compared with the fields between conventional electrodes thereby allowing the electrostatic field to have a relatively high average intensity without sparkover. Furthermore, since the electrostatic field is confined to a relatively small axial dimension, the electrode draws a relatively little amount of current when compared to elongated electrode configurations such as a wire-cylinder electrode configuration. Hence the power required to maintain an intense field across the electrode gap is relatively low. These advantageous features of the electrode configuration result from the electrostatic field being a combination of the field of a wire-cylinder when viewed along the axis of the collecting electrode 34 and the field of a wire-plate electrode when viewed along a radial of the discharge electrode 36. In a conventional wire-cylinder electrode configuration, a wire extends along the axis of a cylinder. The electric field between the cylinder and the wire is entirely radial with no components (neglecting edge effects at the ends of the cylinder) along the axis of the cylinder. As is well known in the art, the electric field intensity between wire-cylinder electrodes is inversely proportional to the distance from the center of the wire. When a voltage is initially placed between the wire and cylinder, a space charge is not present. However, as the voltage increases to a corona starting voltage, the electrons in the air adjacent the wire (where the field is the greatest) are accelerated toward the cylinder (assuming a negative voltage on the wire), impinging on gas molecules and driving off additional electrons. Since the molecules have now lost an electron, they become positive ions which, by virture of the wire's negative potential, accumulate adjacent the wire. The space charge continues to build up by a phenomena commonly known as the "avalanche process". In the avalanche process the high-energy electrons accelerated radially outward by the electrostatic field strike additional molecules. The extremely high energy of the electrons allows them to separate electrons from the nucleus of the molecule by collision thereby creating additional free electrons and additional positive ions. It is to be emphasized that the avalanche process occurs only near the wire since it is in this region that the field is the greatest. As the electrons migrate radially toward the cylinder, the deceleration caused by striking molecules exceeds the acceleration caused by the field since the intensity of the field is reduced away from the wire. At points where the field is approximately 30 kv/cm and below the free electrons, instead of freeing additional electrons by the avalanche process, attach to electronegative gas molecules to form negative ions such as from $O_2$ to $O_2^-$ when air is the gas between the electrodes. Oxygen is the only major electronegative component of air. Thus, for air the only negative ion is the $O_2^-$ ion. However, other negative ions may be formed for other electronegative gases. Other commonly produced electronegative stack gases include $SO_2$, water vapor and $CO_2$. The $O_2$ ions are accelerated toward the positive potential cylinder where, on route, they form a negative ion space charge in the interelectrode region. In summary, in the area adjacent the wire where the field is greater than 30 kv/cm, electrons which are accelerated by the field have sufficient kinetic energy so that when they strike molecules a free electron and a positive ion are formed by the avalanche process. Away from the wire, the energy reduced electrons attach to oxygen molecules forming $O_2^-$ ions. As positive ions accumulate adjacent the negative potential wire and negative ions accumulate between the positive space charge and the cylinder, the electric field is modified so that the intensity of the electrostatic field adjacent the wire is reduced while the intensity of the electrostatic field toward the cylinder is increased. The reduced electrostatic field adjacent to the wire reduces the quantity of free electrons and positive ions produced by the avalanche process, and the increased electrostatic field adjacent the cylinder increases the migration of negative ions toward the cyliner. The result is a stabilizing, or negative feedback effect which maintains a space charge density relatively constant with time as well as uniform around the periphery of the discharge electrode 36.

Electrostatic fields produced by the wire-cylinder electrode configuration are relatively inefficient since the relatively large area of the cylinder walls results in a large inter-electrode current flow to maintain a given average field intensity. Further, it is believed that the point at which sparkover between electrodes occurs is a function of the current flow as well as the field intensity. Thus, for a wire-cylinder electrode configuration, it is not possible to increase the field to any great degree without also increasing substantially the current flow between the electrodes and initiating sparkover.

In the wire-plate electrode configuration a wire is positioned in parallel between a pair of parallel plates, and the gas stream passes through the field along a line perpendicular to the wire and parallel to the plates. The electrostatic field generated by the wire-plate electrode configuration produces a space charge in the same manner as the wire-cylinder electrode configuration. However, since the electrostatic field adjacent the plates is more intense directly across from the wire, the space charge formed by the $O_2^-$ negative ions from other electronegative gases is more concentrated in this area. This is in contrast to the $O_2^-$ ion distribution of the wire-cylinder electrode configuration where the negative ion concentration is uniformly distributed around the periphery of the cylinder. The space charge amplification of the wire-plate electrostatic field is extremely intense opposite the wire so that the electrostatic field between the wire and the plates increases greatly toward the plates. The high electrostatic field at the plates causes sparkover unless the average field intensity is maintained at a relatively low value. Therefore, with a wire-plate electrode configuration it is not possible to achieve relatively large average electrostatic fields. With the wire-plate electrode configuration, as with the wire-cylinder electrode configuration, the electrostatic field (neglecting edge effects at the ends of the wire) does not vary along the axis of the wire. In other words, the components of the electrostatic fields extend only in two directions of a cartesian coordinate system and results in non-uniform electrostatic fields between the electrodes.

The electrostatic field produced between the discharge electrode 36 and the collecting electrode 34 has components which extend along the three axes of a cartesian coordinate system. The X and Y components of the field (or the R components in a cylindrical coordinate system) are substantially identical to the electrostatic field of the wire-cylinder electrode configuration when viewed along the axis of the cylinder. Thus, the concentration of negative ions in the inter-electrode gap in a plane transverse to the outer electrode 34 expands radially from the inner electrode resulting in reduced space charge amplification of the electrostatic field toward the outer electrode 34. However, the electrostatic field between the discharge electrode 36 and collecting electrode 34, when viewed in a plane axial of the outer electrode 36, is substantially identical to the electric field of the wire-plate electrode configuration. The concentration of negative ions in a plane passing through the axis of the outer electrode 36 is greater in the plane of the discharge electrode 36 than at points axially spaced therefrom along the collecting electrode 34 resulting in increased space charge amplification of the electrostatic field in the plane of the discharge electrode 36. The combination of the continuously decaying electrostatic fields of the wire-cylinder and the increasing electrostatic field of the wire-plate produced between the discharge electrode 36 and the outer electrode 34 results in a field intensity which is substantially uniform about the periphery of the discharge 36 and along a radial of the discharge electrode 36 throughout a substantial distance from the outer electrode 34 toward the discharge electrode 36. The intensity of this uniform field is slightly less than the average intensity of the field between the discharge electrode 36 and the collecting electrode 34. The uniformity of the electrostatic field allows a highly intense average field without producing sparkover since there is no point at which the field becomes excessively intense such as at the plate of a wire-plate system, which limits the average intensity of the field which can be applied without sparkover. The electrostatic field between the discharge electrode 36 in the collecting electrode 34 is also less prone to sparkover because it produces far less current per unit area than conventional wire-plate configuration at a given applied field.

Both the wire-plate and wire-cylinder electrode configurations generate electrostatic fields which contact relatively large areas thus causing a relatively large current flow at high applied fields. The electrostatic field between the discharge electrode 36 and the collecting electrode 34 does not contract a large surface area since the field is relatively thin. Thus, a relatively small amount of current, and hence power, is required to maintain a relatively large average field intensity.

By securing the discharge electrode 36 directly to the support electrode 38 a single electrode mounting system may be used for both the charging stage of the precipitator as well as the collecting stage of the precipitator. Further, by varying the diameters of the discharge electrode 36 and the support electrode 38 with respect to each other and the outer electrode 34, the intensities of the fields extending between the discharge electrode 36 and the outer electrode 34 and between the support electrode 38 and the outer electrode 34 can be independently selected even though both electrodes 36,38 are powered by a common transformer-rectifier unit. Consequently the cost and complexity of the precipitator compared to conventional precipitators is greatly reduced.

In order to increase the efficiency of the precipitator, particularly where various sized particles are to be removed, multiple electrode staging may be employed as illustrated in FIG. 3. A plurality of disc shaped discharge electrodes 80,82,84 are secured to a support electrode 86 at axially spaced points greater than 1.2 discharge electrode gaps apart from each other. A spacing between electrodes 80,82,84 of greater than 2 discharge electrode gaps is preferable to prevent the fields extending from adjacent discharge electrodes from interfering with each other and to provide an electric field extending from the support electrode 86 having a length sufficient to collect charged particles. Inter-electrode spacings of less than 1.2 discharge electrode gaps cause interference between adjacent fields which prevents axial expansion of the fields thereby reducing the stability of the corona discharges. As the gas passes through the outer electrode 34 the particles entrained in the gas are thus subjected to a plurality of charging fields between collection stages. If desired, the diameters of the discharge electrodes 80,82,84 may be varied so that the average intensities of the fields extending between the discharge electrodes 80,82,84 and the outer electrode 34 are different for each electrode 80, 82,84. Large particles are generally easier to precipitate and are thus removed with greater ease at less intense applied fields. Consequently where the particles to be collected vary in size it may be desirable to progressively increase the diameter of discharge electrodes along the gas flow so that particles are subjected to increasingly more intense fields as they flow through the outer electrode 34. The largest particles are thus collected on the inner walls of the outer electrode 34 just beyond the smaller diameter discharge electrode 80, smaller particles are collected just beyond the intermediate diameter discharge electrode 82, and the smallest particles are collected beyond the larger diameter discharge electrode 84.

The larger charged particles produce localized field anomolies which tend to produce sparkover in these localized regions. By removing the larger particles near the smaller diameter discharge electrode 82 the intensity of the field between the larger diameter discharge electrode 84 and the outer electrode 34 can be increased thereby removing a greater percentage of smaller particles and increasing the overall collection efficiency of the system.

If desired a low field corona discharge may be produced between the support electrode 38 and the outer electrode 34 by helically wrapping a conductor, such as a wire, around the support electrode 38. The low field corona discharge is particularly useful where the outer electrode is intermittantly cleaned since the corona current holds the particles on the inner wall of the outer electrode until they are removed by any suitable technique such as rapping. Where the particples are continuously removed by a water film, for example, there is no necessity to retain the particles on the outer electrode in this manner.

The embodiments of the invention in which a particular property or privilege is claimed are defined as follows:

1. A system for collecting particles suspended in a gas, comprising:
   a tubular, outer electrode,
   an elongated, electrically conductive support electrode positioned within said outer electrode;
   support means for fixedly mounting said support electrode within said outer electrodes;
   a plurality of disc shaped discharge electrodes concentrically mounted with said support electrode at least 1.2 discharge electrode gaps apart from each other, each of said discharge electrodes having a smoothly curved outer periphery with the edge radius of said periphery being at least 0.02 of the radius of said outer electrode, said support electrode having a diameter which is between 0.15 and 0.25 the inside diameter of said outer electrode, and between 0.4 and 0.8 the diameter of said discharge electrode such that when a predetermined potential is applied between said outer electrode and said discharge and support electrodes a radially and axially expanding, radially and circumferentially uniform corona discharge is generated between said discharge and outer electrodes, and a radial, non-corona electric field is generated between said support and outer electrodes; and
   means for directing said gas into the first end of said outer electrode and removing gas at the opposite end thereof.

2. The system of claim 1, wherein said discharge electrodes are of different diameters such that different applied average fields are maintained between each of said discharge electrodes and said outer electrode.

3. A system for collecting particles suspended in a gas comprising:
   a tubular, outer electrode;
   an elongated, electrically conductive support electrode positioned within said outer electrode and terminating adjacent a first end thereof;
   support means for fixedly mounting said support electrode within said outer electrodes;
   a plurality of generally planar discharge electrodes concentrically secured to said support electrode and defining respective discharge electrode gaps between each discharge electrode and said outer electrode, said discharge electrodes being at least 1.2 discharge electrode gaps apart from each other, each of said discharge electrodes having a smoothly curved outer periphery with the edge radius of said periphery being at least 0.01 of the transverse dimension of said outer electrode, the transverse dimensions of said support and discharge electrodes being selected such that when a predetermined potential is applied between said outer electrode and said discharge and support electrodes an axially expanding, radially and circumferentially uniform corona discharge is generated between said discharge and outer electrodes, and a radial, non-corona electric field is generated between said support and outer electrodes; and
   means for directing said gas into the first end of said outer electrode and removing gas at the opposite end thereof.

4. The system of claim 3, wherein said discharge electrodes are of different diameters such that different applied average fields are maintained between each of said discharge electrodes and said outer electrode.

5. The system of claim 4 wherein the transverse dimensions of said discharge electrodes are progressively increased away from said first end such that said particles are subjected to increasingly more intense fields as they flow through said outer electrode.

6. A method of removing particles from a particle entrained gas comprising:
   sequentially directing said particle entrained gas through a plurality of non-overlapping, radially and axially expanding, radially and circumferentially uniform electrostatic fields having an applied average intensity of greater than 10 kv per centimeter at standard atmospheric conditions, each of said field being generated by a disc shaped discharge electrode concentrically mounted with a tubular outer electrode, said discharge electrodes being spaced at least 1.2 discharge electrode gaps apart from each other and having a smoothly curved outer periphery with the edge radius of said periphery being at least 0.02 of the radius of said outer electrode; and
   passing said charged particle entrained gas through an elongated, electric field downstream of each of said electrostatic fields such that said charged particles are deflected toward a collection electrode.

7. The method of claim 6, wherein said electrostatic fields are progressively increased moving in the direction of gas flow so that larger particles are removed by upstream fields in advance of downstream fields where finer particles are removed thereby increasing the stability of said downstream fields such that the collection efficiency of said system is increased.

8. The method of claim 6, wherein said electrostatic fields are spaced apart from each other by at least 1.2 times the radial dimensions of said fields thereby restricting said fields from interfering with each other.

* * * * *